United States Patent
Kodama (10) Patent No.: US 9,278,675 B2
(45) Date of Patent: Mar. 8, 2016

(54) HYDRAULIC CONTROL APPARATUS AND METHOD FOR MANUFACTURING THE SAME

(75) Inventor: Takuro Kodama, Ueda (JP)

(73) Assignee: NISSIN KOGYO CO., LTD, Nagano (JP)

( * ) Notice: Subject to any disclaimer, the term of this patent is extended or adjusted under 35 U.S.C. 154(b) by 779 days.

(21) Appl. No.: 13/302,361

(22) Filed: Nov. 22, 2011

(65) Prior Publication Data

US 2012/0132837 A1    May 31, 2012

(30) Foreign Application Priority Data

Nov. 25, 2010 (JP) ................................. 2010-261921

(51) Int. Cl.
*B60T 8/36* (2006.01)
(52) U.S. Cl.
CPC ............ *B60T 8/368* (2013.01); *Y10T 29/49002* (2015.01)
(58) Field of Classification Search
CPC ..... B60T 8/3645; B60T 8/368; B60T 8/3615; B60T 8/4827; Y10T 29/49002; F16K 31/04; B23P 11/00
USPC .............. 137/15.01, 15.03, 315.06, 316, 360, 137/361; 220/327, 328; 303/119.1, 119.3; 251/129.01
See application file for complete search history.

(56) References Cited

U.S. PATENT DOCUMENTS

| | | | | |
|---|---|---|---|---|
| 2,622,529 | A * | 12/1952 | Parsons | 222/318 |
| 5,288,141 | A * | 2/1994 | Isshiki et al. | 303/119.3 |
| 5,657,672 | A * | 8/1997 | Mochizuki et al. | 74/606 R |
| 5,681,099 | A * | 10/1997 | Steffes et al. | 303/119.2 |
| 6,059,382 | A * | 5/2000 | Schoettl | 303/119.3 |
| 6,186,603 | B1 * | 2/2001 | Park | 303/119.3 |
| 6,634,723 | B1 * | 10/2003 | Ganzel et al. | 303/119.3 |
| 6,786,466 | B1 * | 9/2004 | Risch et al. | 251/129.15 |
| 6,985,060 | B2 * | 1/2006 | Parker et al. | 335/282 |
| 7,040,720 | B2 * | 5/2006 | Sanada | 303/119.3 |
| 7,201,585 | B2 * | 4/2007 | Pirner et al. | 439/76.1 |

(Continued)

FOREIGN PATENT DOCUMENTS

EP    2008895 A2    12/2008
JP    10126069 A    5/1998

(Continued)

OTHER PUBLICATIONS

Extended European Search Report for Application No. 11190487.6-2423 / 2457788, date—Nov. 21, 2012, 9 pages.

(Continued)

*Primary Examiner* — Craig Schneider
*Assistant Examiner* — Frederick D Soski
(74) *Attorney, Agent, or Firm* — Andrew M. Calderon; Roberts Mlotkowski Safran & Cole, P.C.

(57) ABSTRACT

A hydraulic control apparatus is disclosed which includes: a base body; and a housing to be fixed to one surface of the base body. The housing includes an opening facing the one surface of the base body. The opening includes a flange portion formed on and projected outwardly from an opening edge portion. The flange portion includes a screw-formed housing fixing hole for fixing the housing to the base body using a fastening member and a reference hole for provisionally fixing the housing when assembling parts to the housing. The reference hole is formed by lightening the flange portion and arranged parallel to the housing fixing hole.

20 Claims, 5 Drawing Sheets

(56) References Cited

U.S. PATENT DOCUMENTS

| | | |
|---|---|---|
| 7,720,589 B2 * | 5/2010 | Hashiba .......................... 701/83 |
| 7,905,558 B2 * | 3/2011 | Wagu et al. ................. 303/119.3 |
| 7,926,782 B2 * | 4/2011 | Tsuruta .................... 251/129.15 |
| 2003/0194886 A1 | 10/2003 | Mundry et al. |
| 2004/0012257 A1 * | 1/2004 | Jocham ...................... 303/119.2 |
| 2004/0032164 A1 * | 2/2004 | Tsunooka et al. ......... 303/119.3 |
| 2004/0074536 A1 * | 4/2004 | Nakamura .................... 137/343 |
| 2005/0018390 A1 * | 1/2005 | Sanada et al. ................. 361/679 |
| 2005/0057092 A1 * | 3/2005 | Segawa ...................... 303/116.4 |
| 2005/0057093 A1 * | 3/2005 | Segawa et al. ............. 303/119.3 |
| 2007/0199775 A1 * | 8/2007 | Yasukawa .................... 188/73.1 |
| 2008/0036292 A1 | 2/2008 | Sakai et al. |
| 2008/0088176 A1 * | 4/2008 | Ota ............................... 303/155 |
| 2009/0001808 A1 * | 1/2009 | Kodama et al. ............ 303/119.1 |
| 2009/0136318 A1 * | 5/2009 | Hartmann ..................... 411/353 |
| 2010/0264723 A1 * | 10/2010 | Atsushi et al. .................. 303/10 |

FOREIGN PATENT DOCUMENTS

| | | |
|---|---|---|
| JP | 11301440 A | 11/1999 |
| JP | 2003284219 A | 10/2003 |
| JP | 2006074986 A | 3/2006 |
| JP | 2009006855 A | 1/2009 |
| JP | 2009040125 A | 2/2009 |

OTHER PUBLICATIONS

Japanese Patent Office Action for Application No. 2010-261921, drafting date—Oct. 4, 2012, 5 pages with translation.

* cited by examiner

HYDRAULIC CONTROL APPARATUS AND METHOD FOR MANUFACTURING THE SAME

CROSS-REFERENCE TO RELATED APPLICATION(S)

This application claims priority from Japanese Patent Application No. 2010-261921 filed on Nov. 25, 2010, the entire contents of which are incorporated herein by reference.

FIELD

The present invention relates to a hydraulic control apparatus and a method for manufacturing the same.

BACKGROUND

For example, JP-2009-006855-A discloses a hydraulic control apparatus which includes a base body and a housing. The housing includes a housing fixing hole formed in the surface thereof facing the base body, and the base body includes a housing mounting penetration hole. The housing is mounted onto the base body by inserting a housing fixing screw into the housing mounting penetration hole of the base body from the back surface to the front surface (housing mounting surface), and by thread-tightening the leading end of the fixing screw with a female screw of the housing fixing hole of the housing.

When electric parts, such as a solenoid coil (electric part assembly) to be mounted on an electromagnetic valve and an ECU, are assembled to the housing, or when a cover is fixed to the housing, the housing will be fixed provisionally. In view of manufacturability, it may be attempted to provisionally fix the housing by inserting a provisionally fixing pin into the housing fixing hole. However, such method is not preferable since the provisionally fixing pin inserted into the housing fixing hole also contacts the female screw formed therein. To avoid the contact between the female screw in the fixing hole and the fixing pin, the housing can be simply gripped as a provisional fixing without using the fixing pin. But, in this case, the gripping part of a sufficient size may be required, resulting in the complicated structure.

SUMMARY

One object of the invention to provide a hydraulic control apparatus and its manufacturing method which can provisionally fix a housing accurately with a simple structure.

According to Inventive aspect 1, there is provided a hydraulic control apparatus, including: a base body; and a housing to be fixed to one surface of the base body, wherein the housing includes an opening facing the one surface of the base body, wherein the opening includes a flange portion formed on and projected outwardly from an opening edge portion, and wherein the flange portion includes a screw-formed housing fixing hole for fixing the housing to the base body using a fastening member and a reference hole for provisionally fixing the housing when assembling parts to the housing, the reference hole being formed by lightening the flange portion and arranged parallel to the housing fixing hole.

In this structure, since the reference hole and the housing fixing hole are formed separately, the housing can be provisionally fixed with high precision while preventing the pin of the fixing jig from contacting the female screw of the housing fixing hole, using the fixing jig having a relatively simple structure. Since the reference hole is formed by lightening the flange portion in which the fixing hole for fixing the housing to the base body is also formed, the thickness balance of the flange portion can be enhanced in view of the generation of sink when resin molding the housing.

According to Inventive aspect 2, there may be provided the apparatus, wherein the opening has a substantially rectangular shape, wherein a pair of the flange portions are outwardly provided along two facing sides of the opening, and the housing fixing hole and the reference hole are provided in each flange portion, and wherein, in the flange portions, the housing fixing holes are respectively offset along the longitudinal direction of the flange portions from longitudinal centers thereof, and the reference holes are respectively formed nearer to the longitudinal centers than the housing fixing holes.

With this structure, since the reference holes can be respectively formed in spaces saved by offsetting the housing fixing holes, the fixing holes and reference holes can be formed parallel to each other without impairing the reinforcing effect of the flange portion.

According to Inventive aspect 3, there may be provided the apparatus, wherein the distance between the two housing fixing holes is set different from the distance between the two reference holes.

With this structure, when provisionally fixing the housing in order to assemble the parts to the housing, the paired pins of the fixing jig can be prevented from being erroneously inserted into the housing fixing holes and can be surely inserted into the reference holes. Thus, the positioning of the housing during the provisional fixation can be facilitated.

According to Inventive aspect 4, there may be provided the apparatus, wherein the reference hole is formed larger in diameter than the housing fixing hole.

With this structure, when provisionally fixing the housing in order to assemble the parts to the housing, the paired pins of the fixing jig can be prevented from being erroneously inserted into the housing fixing holes and can be surely inserted into the reference holes. Thus, the positioning of the housing during the provisional fixation can be further facilitated.

According to Inventive aspect 5, there may be provided the apparatus, further including: a motor fixed to a back surface of the base body opposite to the one surface, wherein the motor is fixed to the base body by a motor fixing screw which is inserted from the back surface side of the base body, and wherein the housing is fixed to the base body by a housing fixing screw which is inserted from the back surface side toward the one surface side of the base body so as to be thread-engaged with the housing fixing hole.

With this structure, since the motor fixing hole and the housing fixing hole can be tightened from the same direction, the operation can be performed easily.

According to Inventive aspect 6, there is provided a method for manufacturing a hydraulic control apparatus using a fixing jig, the hydraulic control apparatus including a base body and a housing to be fixed to one surface of the base body, the fixing jig including a housing fixing pin and a parts fixing pin, the method including: forming a screw-formed housing fixing hole for fixing the housing to the base body and a reference hole for provisionally fixing the housing when assembling parts to the housing, the housing fixing hole and the reference hole being arranged parallel to each other; mounting the parts onto the parts fixing pin of the fixing jig to thereby provisionally fix the parts; inserting the housing fixing pin of the fixing jig into the reference hole to thereby provisionally fix the housing; and connecting connection terminals of the housing and connection terminals of the parts to thereby fix together the housing and the parts.

With this method, since the reference hole is formed separately from the housing fixing hole, while preventing the pin of the fixing jig from contacting the female screw of the housing fixing hole, the housing can be provisionally fixed using a fixing jig having a relatively simple structure.

According to Inventive aspect 7, there may be provided the method, wherein the parts fixing pin and the housing fixing pin are formed integrally with a base portion of the fixing jig.

This method can facilitate the provisional fixation of the housing and parts to the fixing jig and can enhance the assembling precision of the parts to the housing.

According to this invention, the housing can be provisionally fixed with high precision using a simple structure.

DETAILED DESCRIPTION

Figure 1:
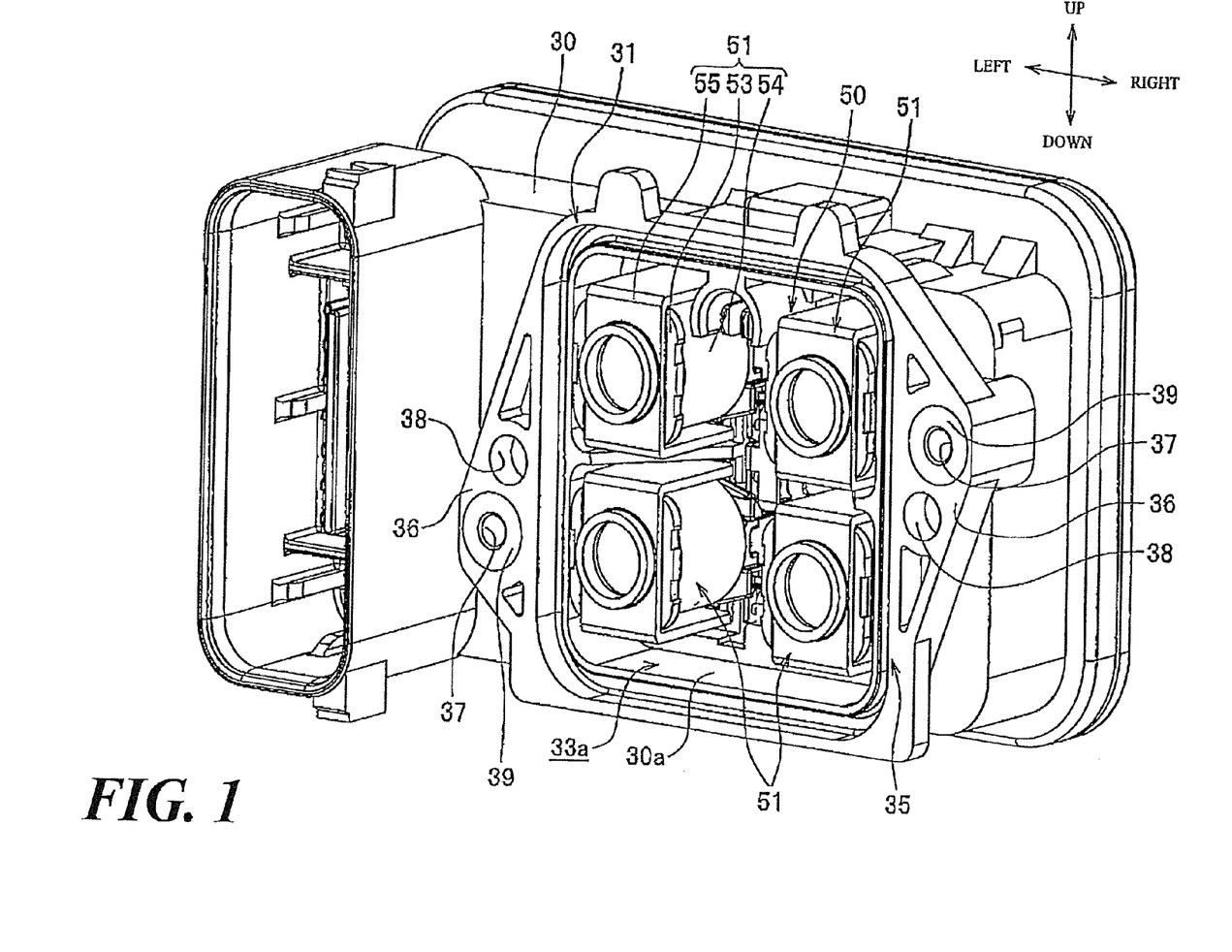
FIG. 1 illustrates a housing and its internal parts to be included in a hydraulic control apparatus according to an embodiment.
Figure 2:
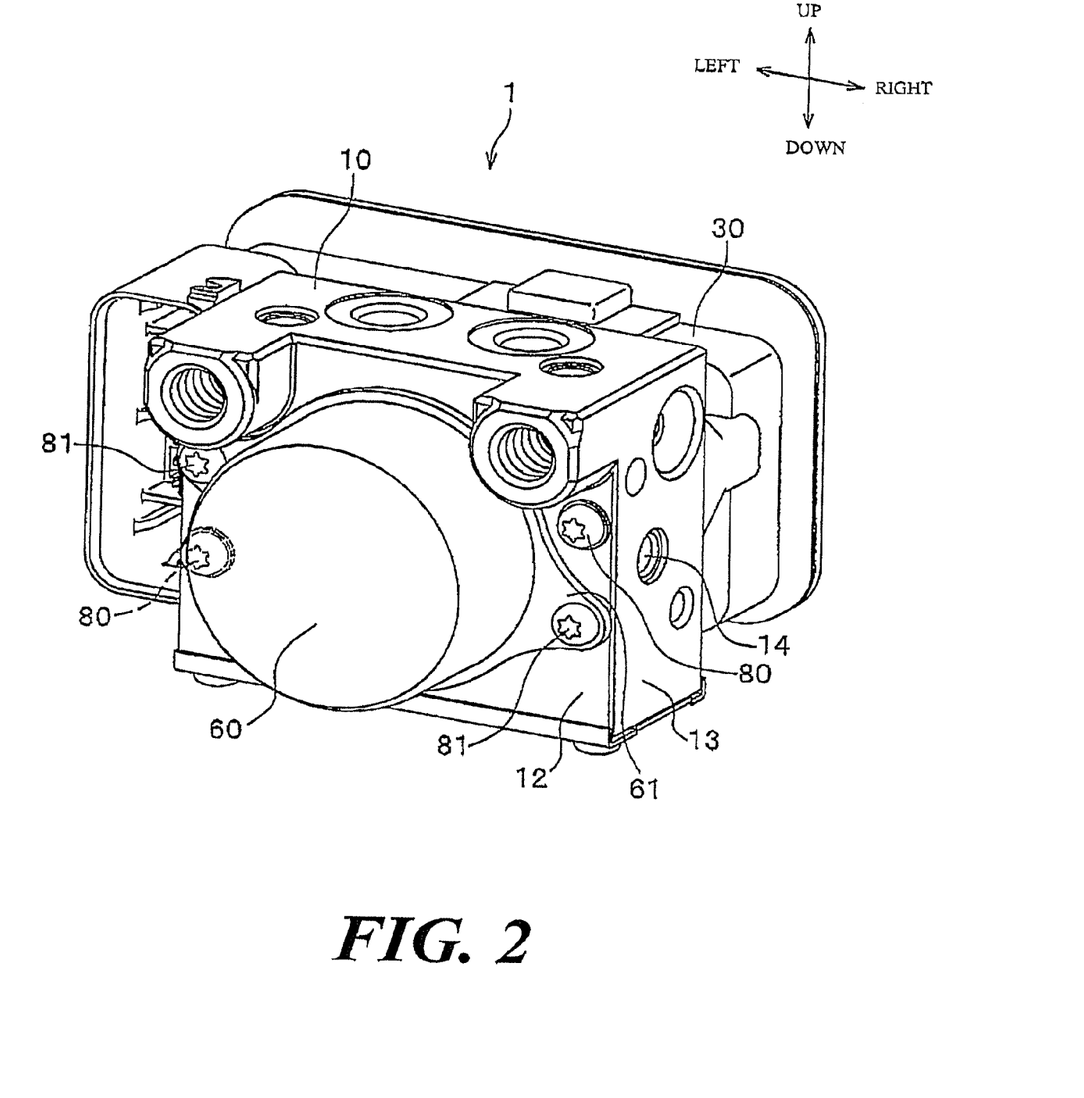
FIG. 2 illustrates the hydraulic control apparatus according to the embodiment.
Figure 4:
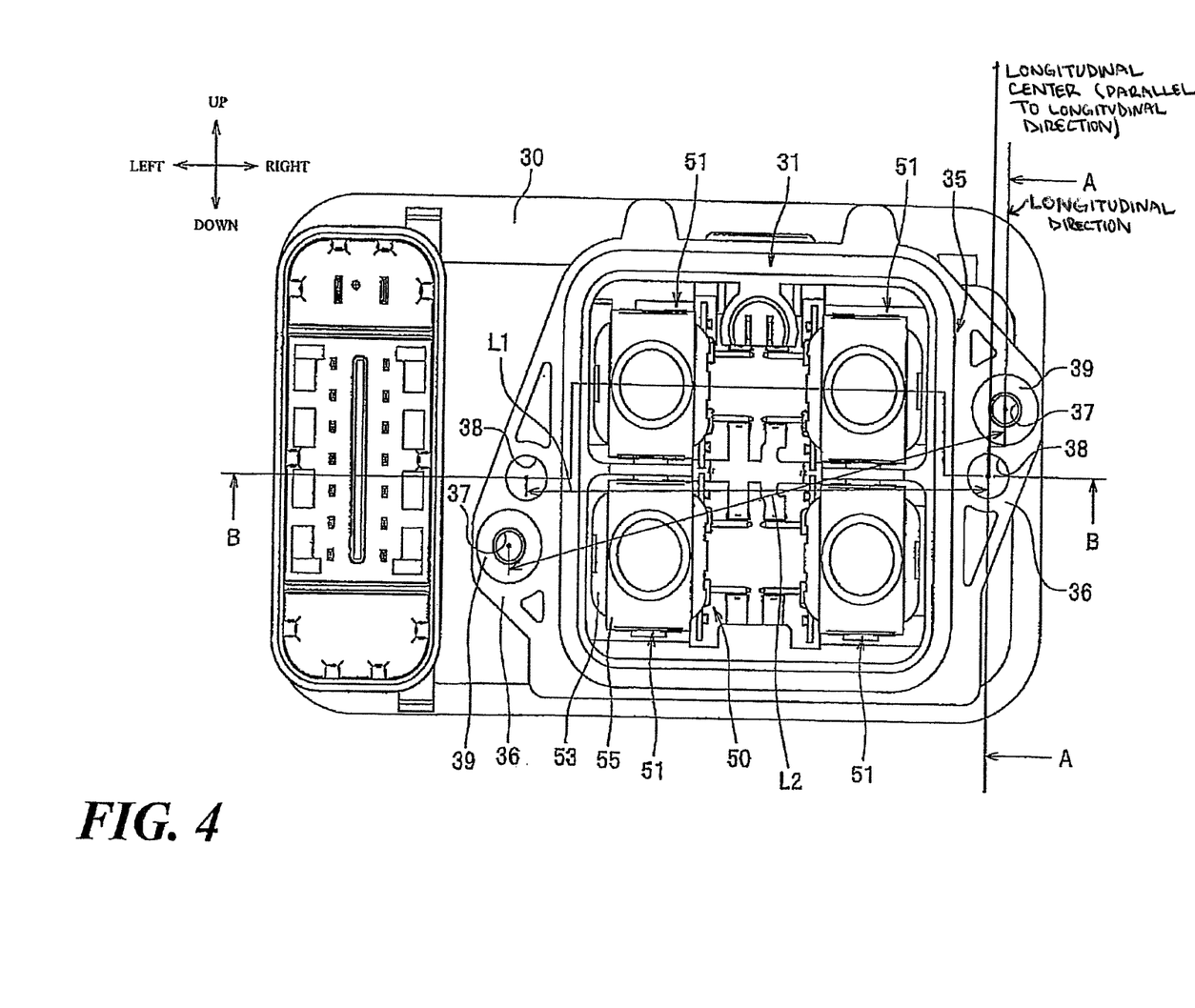
FIG. 4 illustrates the housing and the internal parts from a front.

An embodiment will be described with reference to the accompanying drawings. Firstly, the whole structure of the hydraulic control apparatus according to the embodiment will be described. In the embodiment, upper, lower, right and left directions correspond to a direction when the housing side is viewed from the base body side, as shown in FIGS. 1, 2 and 4. These directions may be changed the hydraulic control apparatus is actually mounted on the automobile.

As shown in FIG. 2, a hydraulic control apparatus 1 according to the embodiment includes a base body 10, an electromagnetic valve (not shown) disposed on one surface 11 (see FIG. 3) of the base body 10, a housing 30 mounted on the one surface 11 of the base body 10, and a motor 60 disposed on the back surface (an opposite surface of the one surface 11) of the base body 10.

The base body 10 is a metal member having a substantially rectangular parallelepiped shape. The base body 10 includes therein a flow passage for brake liquid, a motor rotation shaft storage hole (not shown), pump storage holes 14 and the like. The rotation shaft storage hole is a bottomed cylindrical hole opened at the back surface 12 into which the rotation shaft (not shown) of the motor 60 is stored. The pump storage holes 14 respectively penetrate from the inner peripheral surface of the rotation shaft storage hole to the two side surfaces 13 of the base body 10. Thus, the pair of pump storage holes 14 are formed on both right and left sides of the rotation shaft storage hole (in FIG. 2, only one of the pair is shown). The pump storage holes 14 respectively extend in the right angle direction (normal line direction) relative to the side surface 13. The pump storage holes 14 are formed on the same axis line.

Figure 3:
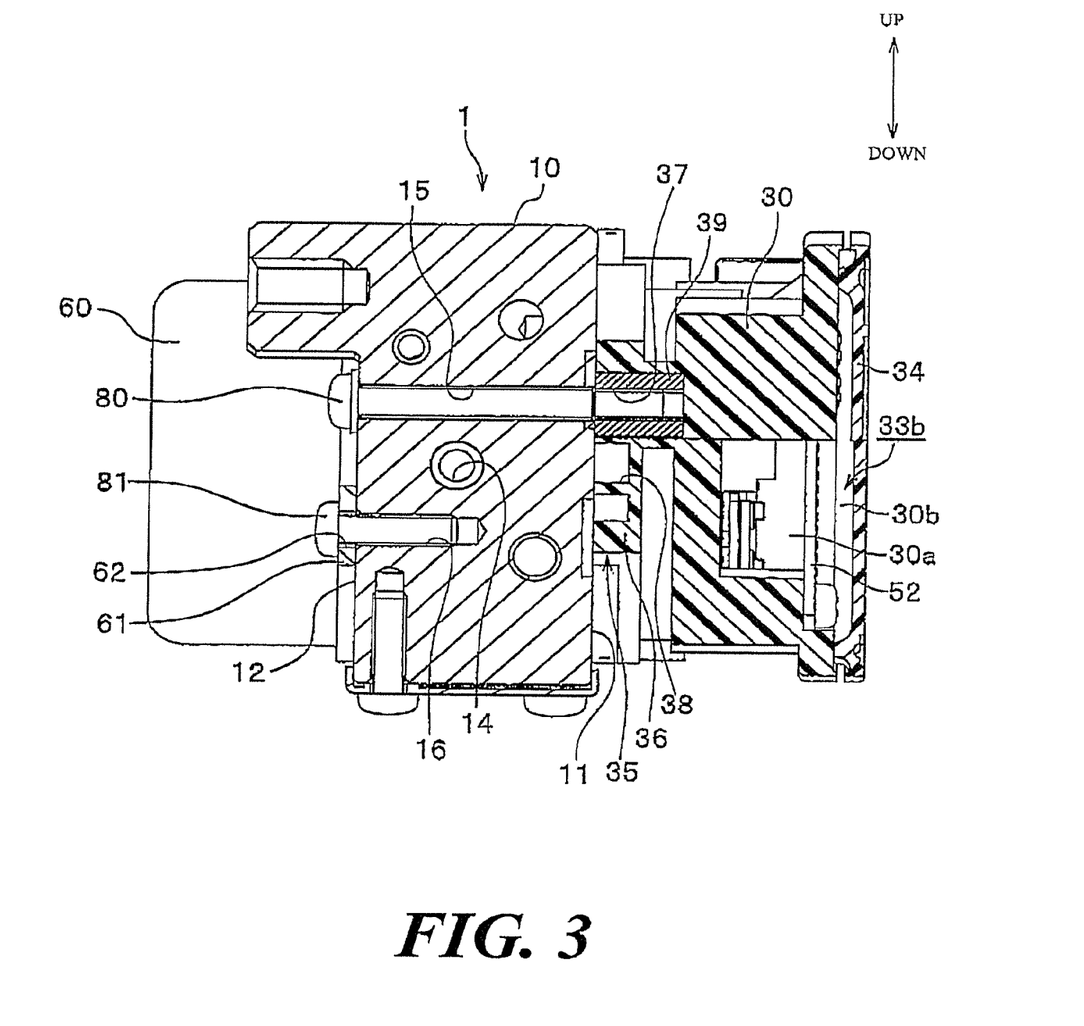
FIG. 3 sectionally illustrates the hydraulic control apparatus.

As shown in FIG. 3, the base body 10 includes a housing mounting penetration hole 15 and a motor fixing hole 16. The housing mounting penetration hole 15 is formed to allow a housing fixing screw 80 for fixing the housing 30 to the base body 10 to penetrate therethrough. The housing mounting penetration hole 15 penetrates through the base body 10 so as to be opened at both of the one surface 11 and the back surface 12 of the base body 10, while it extends in the right angle direction relative to the one surface 11 (in the normal line direction of the one surface 11).

The motor fixing hole 16 is a bottomed hole opened at the back surface 12 into which a motor fixing screw 81 for fixing the motor 60 is inserted. The motor fixing hole 16 includes a female screw with which the motor fixing screw 81 (see FIGS. 2 and 3) is thread-engaged. The motor fixing screw 81 is thread-engaged with the motor fixing hole 16 through a motor mounting penetration hole 62 formed in a flange portion 61 of the motor 60.

As shown in FIG. 2, as viewed from the back surface 12 of the base body 10, the housing mounting penetration holes 15 are arranged in point symmetry with respect to the center of the rotation shaft storage hole. Also, the motor fixing holes 16 are arranged in point symmetry with respect to the center of the rotation shaft storage hole, at positions different from the positions of the housing mounting penetration holes 15. Thus, as viewed from the back surface 12 of the base body 10, the housing mounting penetration holes 15, 15 and the motor fixing holes 16, 16 constitute the vertices of a quadrilateral (in this embodiment, a rectangle), respectively.

The housing mounting penetration holes 15 and motor fixing holes 16 are disposed at positions adjacent to but not interfering with the pimp storage hole 14 while sandwiching the hole 14 between them. The upper housing mounting penetration hole 15 and the upper motor fixing hole 16 are situated at the same height, while the lower housing mounting penetration hole 15 and the lower motor fixing hole 16 are situated at the same height. Thus, in the rectangle defined by the housing mounting penetration holes 15, 15 and the motor fixing holes 16, 16 as the vertices, long sides extend in the horizontal direction and short sides extend in the vertical direction.

As shown in FIGS. 1 and 4, the housing 30 includes electric parts 50 such as electric parts assemblies 51 respectively having, for example, a coil of an electromagnetic valve to be mounted onto the base body 10 and a control unit 52 (see FIG. 3) for controlling the operation of the electromagnetic valve. Although the electric parts 50 are exemplified as "parts" in this embodiment, the "parts" other than the electric parts may also be mounted.

In this embodiment, the electric parts assembly 51 includes a solenoid coil 54 formed by winding a wire around a bobbin 53 surrounding the valve housing of the electromagnetic valve, a connection terminal (not shown) electrically connected to the solenoid coil 54, and a magnetic circuit frame 55 mounted on the bobbin 53 to surround two axial ends thereof. The electric parts assembly 51 is fixed inside the housing 30 by projection welding (electrically welding) its connection terminals to connection terminals (not shown) provided in the housing 30.

The control unit 52 is a control substrate which properly controls a current supply (electric energization) to the electric parts assembly 51, motor 60 and the like to thereby control the operations of the respective electromagnetic valves and motor 60; and, it is fixed to the inside of the housing 30. The control unit 52 is electrically connected through a metal plate embedded in the housing 30 to the electric parts assembly 51 and motor 60.

The housing 30 includes a polygonal-cylinder portion 31 (see FIG. 4). In this embodiment, the polygonal-cylinder portion 31 is formed of resin and has a substantially-rectangular sectional shape (in this embodiment, a square sectional shape). FIG. 3 shows a surface obtained when the hydraulic control apparatus is cut along the A-A line shown in FIG. 4. A first storage portion 30a is situated on the base body side, while a second storage portion 30b is situated on the counter-base-body side (the opposite side of the base body 10). The electric parts assembly 51 (see FIGS. 1 and 4) is stored into the first storage portion 30a, while the control unit 52 is stored into the second storage portion 30b. On the second storage portion 30b side opening 33b of the polygonal-cylinder portion 31 of the housing 30, there is provided a cover member 34 for covering the second storage portion 30b.

As shown in FIGS. 1 and 4, the first storage portion 30a side opening 33a of the polygonal-cylinder portion 31 of the housing 30 faces the one surface 11 of the base body 10. The opening 33a has a substantially rectangular shape (in this embodiment, a square shape). Here, the term "rectangle" or "square" includes a case where the corner portions of this shape are chamfered in a curved shape or obliquely.

Opening edge portions 35 of the opening 33a include flange portions 36 which are respectively provided on and projected outwardly therefrom. The flange portions 36 are formed on a pair of facing right and left sides among the four sides of the opening 33a. Each flange portion 36 includes a housing fixing hole 37 and a reference hole 38.

The housing fixing hole 37 has a female screw with which the leading end of the housing fixing screw 80 is thread-engaged. The housing fixing hole 37 is formed by embedding a screw-formed metal cylindrical bush 39 in the housing 30 by insert molding. The inner peripheral portion of the bush 39 is formed into a female screw to thereby constitute the housing fixing hole 37. The positions of the housing fixing holes 37 are respectively offset along the longitudinal direction (in this embodiment, the vertical direction) of the vertically extending sides (right and left sides) of opening edge portion 35 from the lengthwise center. The positions of the housing fixing holes 37 are adjusted to correspond to the positions of the housing mounting penetration holes 15 in a state where the housing 30 is mounted on the base body 10. The base body side end of the bush 39 opens at the surface of the housing 30 faced to the base body 10, while the other end is covered and closed by the resin which is a part of the housing 30.

Figure 5:
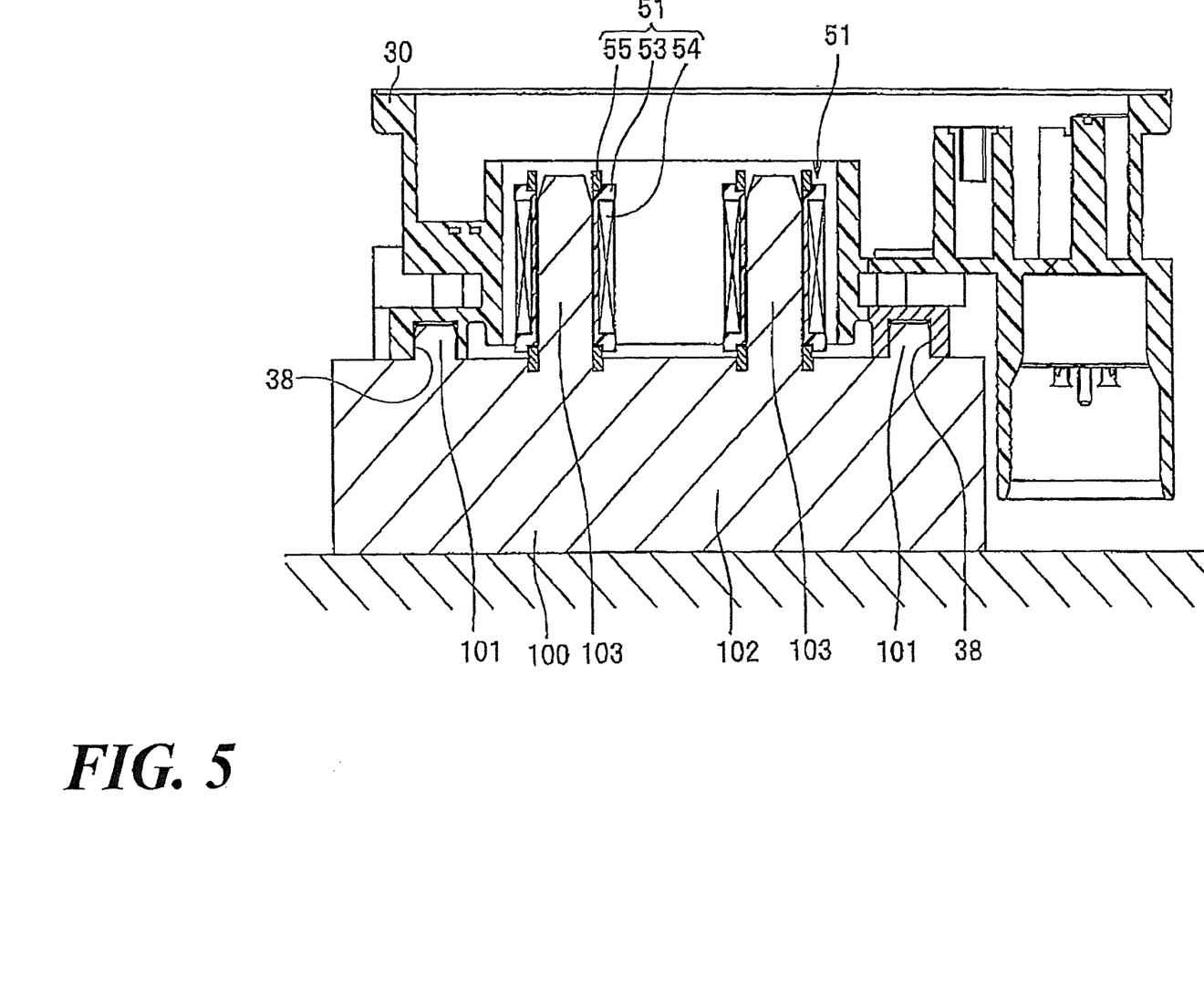
FIG. 5 sectionally illustrates the hydraulic control apparatus, in a state, where the housing is provisionally fixed for assembling the parts to the housing.

In this embodiment, as shown in FIG. 5, a fixing jig 100 is provided. When mounting the electric parts 50 to the housing 30, a housing fixing pin 101 of the fixing jig 100 is inserted into the reference hole 38 for provisionally fixing the housing 30. The reference holes 38 are respectively offset from the housing fixing holes 37 in the paired flange portions 36. Specifically, the reference holes 38 are formed in the flange portions 36 at the positions corresponding to the lengthwise center of the vertically extending sides (right and left sides) of the opening edge portion 35. The axial directions of the reference holes 38 and the axial directions of the housing fixing holes 37 are parallel.

The reference holes 38 are respectively formed in the right and left flange portions 36 and are disposed at symmetric positions with respect to the geometric center of the opening 33a (the crossing portion of the diagonal lines). The distance L1 between the two reference holes 38, 38 (the distance between the axes thereof) are set to be different from the distance L2 between the two housing fixing holes 37, 37 (the distance between the axes thereof). Specifically, the distance L1 between the two reference holes 38, 38 is shorter than the distance L2 between the two housing fixing holes 37, 37. The inside diameter of the reference hole 38 is set such that the housing 30 is fixed to the fixing jig 100 without rattling when the housing fixing pin 101 is fitted into the reference hole 38. The reference hole 38 is formed larger in diameter than the housing fixing hole 37. Specifically, the inside diameter of the top portion of the screw thread (the smaller inner peripheral diameter of the female screw) of the housing fixing hole 37 is larger than the inner peripheral diameter of the reference hole 38.

The flange portion 36 is formed to enclose the housing fixing hole 37 and to extend linearly from the peripheral portion of the housing fixing hole 37 toward the upper and lower corner portions (the upper and lower corner portions existing near the housing fixing holes 37) of the opening edge portion 35. In the flange portion 36, the part between the housing fixing hole 37 and the corner portion and the part between the reference hole 38 and corner portion are respectively lightened for the purpose of weight saving.

Next, a method for manufacturing the hydraulic control apparatus will be described. First, in the housing 30, the housing fixing holes 37 and reference holes 38 are formed side by side (a hole forming step). Consequently, the electric parts 50 are assembled/mounted onto the housing 30 (an assembling step). This assembling step includes a provisionally fixing step of provisionally fixing the electric parts assemblies 51 to the fixing jig 100, a provisionally fixing step of provisionally fixing the housing 30 to the fixing jig 100, and a fixing step of fixing together the electric parts assemblies 51 and the housing 30. When mounting the electric parts 50 onto the housing 30, as shown in FIG. 5, the fixing jig 100 is used. FIG. 5 shows the surface of the apparatus when it is cut along the B-B line shown in FIG. 4. The fixing jig 100 includes a base portion 102, the housing fixing pin 101 and an electric parts assembly fixing pin 103. The housing fixing pin 101 and the electric parts assembly fixing pin 103 respectively extend from the base portion 102. The housing fixing pin 101 and the electric parts assembly fixing pin 103 are formed integrally with the base portion 102. First, after the fixing jig 100 is placed on a flat operation table, the electric parts assembly 51 is mounted onto the electric parts assembly fixing pin 103 (the electric parts assembly provisionally fixing step) and, next, the housing 30 is mounted onto the housing fixing pin 101 (the housing provisionally fixing step), thereby provisionally fixing together the electric parts assembly 51 and the housing 30 integrally.

Since the housing fixing pin 101 is fitted and inserted into the reference hole 38, the housing 30 can be provisionally fixed with high precision without rattling. Also, since the reference hole 38 is formed larger in diameter than the housing fixing hole 37, when provisionally fixing the housing 30 to the fixing jig 100, the housing fixing pin 101 can be prevented from being erroneously inserted into the housing fixing hole 37 but can be surely inserted into the respective reference holes 38. Thus, while the provisionally fixing positioning of the housing 30 can be facilitated, the deformation of the female screw of the housing fixing hole 37 can be avoided. Since the distance L2 between the two housing fixing holes 37 and 37 is different from the distance L1 between the two reference holes 38 and 38, the paired housing fixing pins 101 can be prevented from being erroneously inserted into the housing fixing holes 37 and 37 and can be surely inserted into the respective reference holes 38 and 38, thereby further facilitating the provisionally fixing positioning of the housing 30. Since the housing fixing pin 101 and the electric parts assembly fixing pin 103 are formed integrally with the base portion 102, the electric parts assembly 51 and the housing 30 can be provisionally fixed easily and accurately with high position precision in the assembling step.

After then, the connection terminals (not shown) of the electric parts assembly 51 mounted on the electric parts assembly fixing pin 103 are welded and fixed to the connection terminals (not shown) of the housing 30 (fixing step). In this case, since, the electric parts assembly 51 is provisionally fixed to the fixing jig 100 with high accuracy, the assembling precision of the assembly 51 to the housing 30 can be enhanced. After then, the control unit 52 and the like are mounted and the cover 34 is mounted, thereby completing the mounting of the parts.

Next, the step of fixing the housing 30 and motor 60 to the base body 10 will be described. As shown in FIG. 2, after an electromagnetic valve (not shown) and a reservoir (not shown) are mounted onto the one surface 11 of the base body 10, the housing 30 is adapted on the one surface 11 of the base body 10 to cover the above parts. Then, housing fixing screws 80 each longer than the thickness of the base body 10 are penetrated through the housing mounting penetration holes 15 from the back surface 12 side of the base body 10, and the leading ends thereof are inserted into and thread-tightened with the housing fixing holes 37 of the housing 30. Thus, the housing 30 is attracted and fixed to the base body 10.

Consequently, the motor 60 is adapted on the back surface 12 of the base body 10, the motor fixing screws 81 are penetrated from the back surface 12 side through the motor fixing penetration holes 62, and are thread-tightened with the motor fixing holes 16. Thus, the motor 60 is attracted and fixed to the base body 10.

Since the motor fixing screws 81 and the housing fixing screws 80 are tightened from the same direction, the fixing operation can be performed efficiently. Also, since the housing fixing screws 80 are inserted from the back surface 12 side, the housing fixing holes 37 can be formed within the surface of the housing 30 faced to the base body 10. For example, in a case where screws are inserted from the one surface 11 side, the screws should be provided externally of the outer peripheral portion of the housing 30 in order to secure spaces for tightening the screws. As compared with the above-mentioned case, since the housing fixing screws 80 are inserted from the back surface 12 side, the housing and the hydraulic control apparatus can be reduced in size. Although the housing fixing holes 37 cannot be used as reference holes because they are screw-formed to be thread-engaged with the housing fixing screws 80 which penetrate from the motor 60 side through the base body 10 to thereby fix the housing 30, according to the embodiment, the reference holes 38 can be formed effectively.

In this manufacturing method, since the reference hole 38 is formed separately from the housing fixing hole 37, while the female screw of the housing fixing hole 37 can be prevented from being contacted by the housing fixing pin 101 of the fixing jig 100, the housing 30 can be provisionally fixed with high precision using the fixing jig 100 having a relatively simple structure. Also, since the reference hole 38 is formed in the flange portion 36 by lightening, its thickness balance can be enhanced in view of the generation of sink when resin molding the housing 30.

In this embodiment, since the reference holes 38 are respectively formed in spaces saved by offsetting the housing fixing holes 37, it is not necessary to enlarge the flange portion 36 for forming the reference holes 38, thereby suppressing the size of the housing 30.

Since the two housing mounting penetration holes 15, 15 and two motor fixing holes 16, 16 are respectively disposed to constitute the diagonal corners of a rectangle, the weight balance of the housing 30 in both horizontal and vertical directions can be appropriately adjusted. This can enhance the vibration resistance of the housing 30 and can reduce the size of the housing 30.

Since the housing fixing holes 37 and reference holes 38 are formed separately, as compared with a case where they are formed in the same hole in series (a housing fixing hole with a female screw is formed on the deep side of the hole, and a reference hole with no female screw is formed on this side), the axial length of the hole can be shortened. This can reduce the thickness of the housing 30 (the axial length of the hole) and thus reduce the size of the housing 30.

Although the embodiment has been exemplified, the invention is not limited to the embodiment but can be properly changed in design without departing from the scope of the invention. For example, in the embodiment, the opening 33a has a square shape. However, this is not limitative but it may also have a rectangular shape or other shape, as long as the dimensional variations of the distance from the center to the peripheral edge portion are sufficiently small. For example, the polygonal-cylinder portion 31 may have a circular frame shape or an elliptic frame shape.

Although the reference hole 38 is positioned correspondingly with the lengthwise center of the vertically extending sides of the opening edge portion 35 in the embodiment, the position thereof may be adjusted above or below, as long as the reference hole 38 is set within the surface of the flange portion without interfering with the housing fixing hole 37.

The invention claimed is:

1. A hydraulic control apparatus, comprising:
a base body; and
a housing to be fixed to one surface of the base body,
a motor fixed to a back surface of the base body opposite to the one surface,
wherein the housing includes an opening facing the one surface of the base body, and a pair of flange portions formed on and projected outwardly from an opening edge portion of the opening, and
wherein the pair of flange portions includes a screw-formed housing fixing hole for fixing the housing to the base body using a fastening member and a reference hole for provisionally fixing the housing when assembling parts to the housing, the reference hole being formed by lightening the pair of flange portions and arranged parallel to the housing fixing hole,
wherein the opening has a rectangular shape,
wherein the pair of the flange portions are outwardly provided along two facing sides of the opening, and the housing fixing hole and the reference hole are provided in each flange portion,
wherein, in the pair of flange portions, the housing fixing holes are respectively offset along a longitudinal direction of the flange portions from longitudinal centers thereof, the reference holes are respectively formed nearer to the longitudinal centers than the housing fixing holes, and the longitudinal centers being parallel to the longitudinal direction,
wherein the motor is fixed to the base body by a motor fixing screw which is inserted from the back surface side of the base body, and
wherein the housing is fixed to the base body by a housing fixing screw which is inserted from the back surface side toward the one surface side of the base body so as to be thread-engaged with the housing fixing hole.

2. The apparatus of claim 1,
wherein a distance (L2) between the two housing fixing holes is set different from a distance (L1) between the two reference holes.

3. The apparatus of claim 1,
wherein the reference hole is formed larger in diameter than the housing fixing hole.

4. The hydraulic control apparatus of claim 1,
wherein the opening has the rectangular shape, where corner portions are chamfered in a curved shape or obliquely.

5. The hydraulic control apparatus of claim 1,
wherein the pair of flange portions is formed to enclose the housing fixing hole and to extend linearly from a peripheral portion of the housing fixing hole toward upper and lower corner portions of the opening edge portion.

6. The hydraulic control apparatus of claim 1, wherein the pair of flange portions are formed on a pair of facing right and left sides among four sides of the rectangle shaped opening, and each flange portion includes the housing fixing hole above the reference hole on the facing right side, and the reference hole above the housing fixing hole on the left facing side such that the housing fixing holes are respectively offset along the longitudinal direction of the flange portions from longitudinal centers thereof.

7. The hydraulic control apparatus of claim 1, wherein the housing fixing hole is formed by embedding a screw-formed metal cylindrical bush in the housing, wherein a base body side end of the bush opens at a surface of the housing faced to the base body, while another end is covered and closed by resin which is a part of the housing.

8. The hydraulic control apparatus of claim 1,
wherein the housing fixing hole has a female screw with which a leading end of a housing fixing screw is thread-engaged.

9. The hydraulic control apparatus of claim 8,
wherein, in the pair of flange portions, a part between the housing fixing hole and a corner portion and a part between the reference hole and a corner portion are respectively lightened.

10. The hydraulic control apparatus of claim 1,
wherein the pair of the flange portions are outwardly provided along two sides of the opening.

11. The hydraulic control apparatus of claim 10,
wherein the pair of flange portions are formed on a pair of facing sides among four sides of the opening.

12. The hydraulic control apparatus of claim 10,
wherein positions of the housing fixing holes are respectively offset along a longitudinal direction from a lengthwise center of vertically extending sides of the opening edge portion.

13. The hydraulic control apparatus of claim 10,
wherein the housing fixing hole and the reference hole are provided in each flange portion, and
wherein a second distance (L2) between the housing fixing holes is different from a first distance (L1) between the reference holes.

14. The hydraulic control apparatus of claim 13,
wherein the first distance (L1) is measured between axes of the reference holes and the second distance (L2) is measured between axes of the housing fixing holes.

15. The hydraulic control apparatus of claim 10,
wherein the reference holes are respectively offset from the housing fixing holes in the paired flange portions.

16. The hydraulic control apparatus of claim 15,
wherein axial directions of the reference holes and axial directions of the housing fixing holes are parallel.

17. A hydraulic control apparatus, comprising:
a base body; and
a housing to be fixed to one surface of the base body,
wherein the housing includes an opening facing the one surface of the base body, and a pair of flange portions formed on and projected outwardly from an opening edge portion of the opening, and
wherein the pair of flange portions includes a screw-formed housing fixing hole for fixing the housing to the base body using a fastening member and a reference hole for provisionally fixing the housing when assembling parts to the housing, the reference hole being formed by lightening the pair of flange portions and arranged parallel to the housing fixing hole,
wherein the opening has a rectangular shape,
wherein the pair of the flange portions are outwardly provided along two facing sides of the opening, and the housing fixing hole and the reference hole are provided in each flange portion,
wherein, in the pair of flange portions, the housing fixing holes are respectively offset along a longitudinal direction of the flange portions from longitudinal centers thereof, the reference holes are respectively formed nearer to the longitudinal centers than the housing fixing holes, and the longitudinal centers being parallel to the longitudinal direction,
wherein the reference holes are respectively offset from the housing fixing holes in the paired flange portions,
wherein the pair of the flange portions are outwardly provided along two sides of the opening, and
wherein the reference holes are formed at positions corresponding to a lengthwise center of vertically extending sides of the opening edge portion.

18. A hydraulic control apparatus, comprising:
a base body; and
a housing to be fixed to one surface of the base body,
wherein the housing includes an opening facing the one surface of the base body, and a pair of flange portions formed on and projected outwardly from an opening edge portion of the opening, and
wherein the pair of flange portions includes a screw-formed housing fixing hole for fixing the housing to the base body using a fastening member and a reference hole for provisionally fixing the housing when assembling parts to the housing, the reference hole being formed by lightening the pair of flange portions and arranged parallel to the housing fixing hole,
wherein the opening has a rectangular shape,
wherein the pair of the flange portions are outwardly provided along two facing sides of the opening, and the housing fixing hole and the reference hole are provided in each flange portion,
wherein, in the pair of flange portions, the housing fixing holes are respectively offset along a longitudinal direction of the flange portions from longitudinal centers thereof, the reference holes are respectively formed nearer to the longitudinal centers than the housing fixing holes, and the longitudinal centers being parallel to the longitudinal direction,
wherein the pair of the flange portions are outwardly provided along two sides of the opening, and
wherein the reference holes are respectively formed in right and left flange portions and are disposed at symmetric positions with respect to a geometric center of the opening.

19. A method for manufacturing a hydraulic control apparatus using a fixing jig, the hydraulic control apparatus including a base body and a housing to be fixed to one surface of the base body, the fixing jig including a housing fixing pin and a parts fixing pin, the method comprising:
forming a screw-formed housing fixing hole for fixing the housing to the base body and a reference hole for provisionally fixing the housing when assembling parts to the housing, the housing fixing hole and the reference hole being arranged parallel to each other;

mounting the parts onto the parts fixing pin of the fixing jig to thereby provisionally fix the parts;

inserting the housing fixing pin of the fixing jig into the reference hole to thereby provisionally fix the housing; and connecting connection terminals of the housing and connection terminals of the parts to thereby fix together the housing and the parts.

20. The method of claim 19, wherein the parts fixing pin and the housing fixing pin are formed integrally with a base portion of the fixing jig.

* * * * *